No. 672,429. Patented Apr. 16, 1901.
G. EVERSON.
MATCH MACHINE.
(Application filed June 8, 1899.)
(No Model.) 2 Sheets—Sheet 1.

Witnesses: Inventor:
V. D. Kinner George Everson,
Jo. A. Woelke By
Bartel & Bartel
Attorneys.

No. 672,429. Patented Apr. 16, 1901.
G. EVERSON.
MATCH MACHINE.
(Application filed June 8, 1899.)
(No Model.) 2 Sheets—Sheet 2.
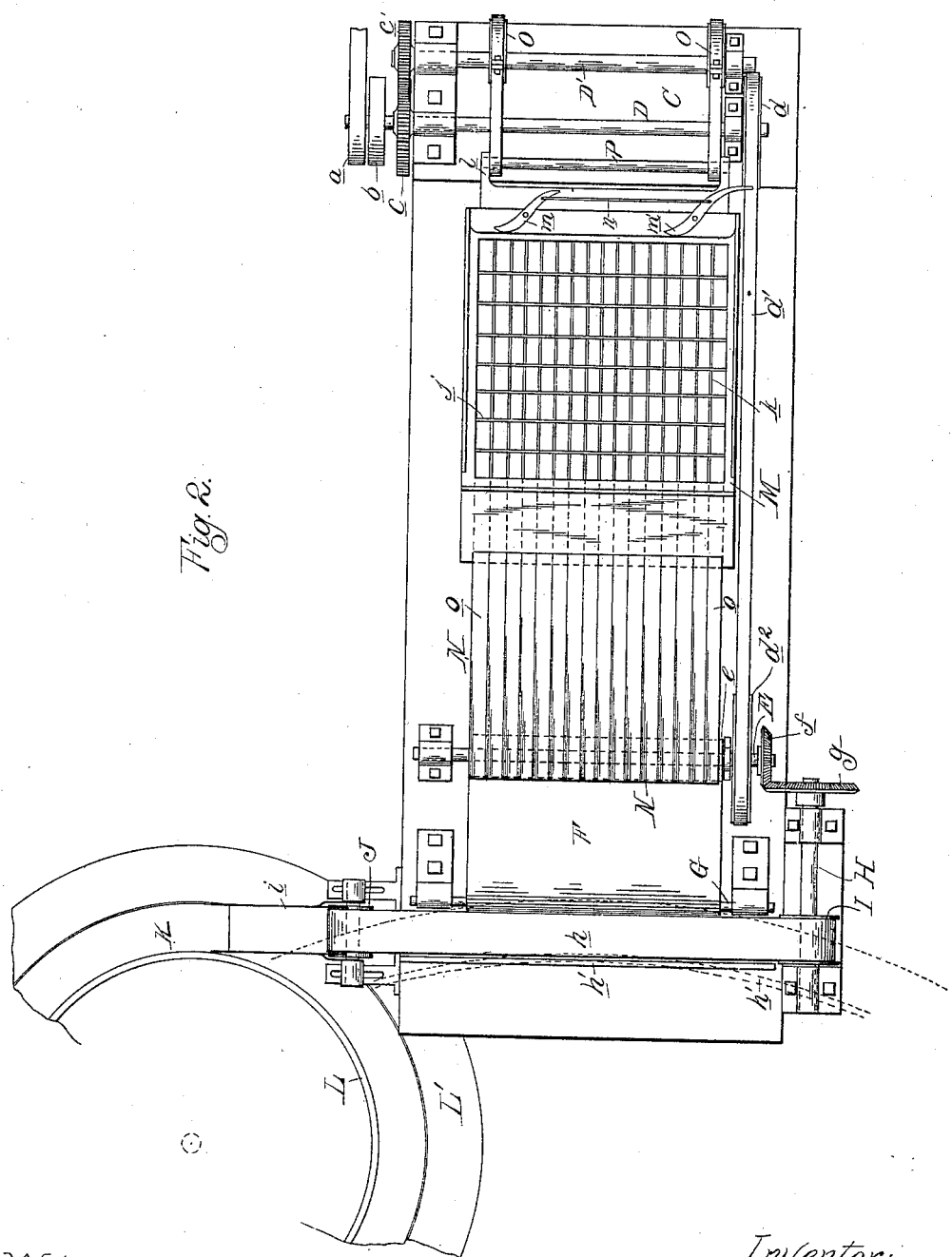
Fig. 2.
Witnesses:
Inventor:
George Everson,
By 
Attorneys.

UNITED STATES PATENT OFFICE.

GEORGE EVERSON, OF DETROIT, MICHIGAN, ASSIGNOR TO ANDREW ANDERSON, OF SAME PLACE.

MATCH-MACHINE.

SPECIFICATION forming part of Letters Patent No. 672,429, dated April 16, 1901.

Application filed June 8, 1899. Serial No. 719,773. (No model.)

*To all whom it may concern:*

Be it known that I, GEORGE EVERSON, a citizen of the United States of America, residing at Detroit, in the county of Wayne and State of Michigan, have invented certain new and useful Improvements in Unloading-Machines for Matches, of which the following is a specification, reference being had therein to the accompanying drawings.

My invention relates to that class of machines for unloading matches in which dipping-frames are employed, and has for its object to produce a machine that will take the matches from the dipping-frame and deliver them to where they are packed into boxes without the intervention of hand labor, thereby greatly increasing the capacity of a plant with little outlay and doing away with the great source of danger of igniting the matches from incautious handling.

The invention consists in the peculiar construction of a hopper having a reciprocating bottom and operating means therefor, whereby the matches are arranged in parallelism and delivered onto the carrier-belt.

The invention further consists in the peculiar construction, arrangement, and operation of the various parts, all as more fully hereinafter described, and shown in the accompanying drawings, in which—

Figure 1:
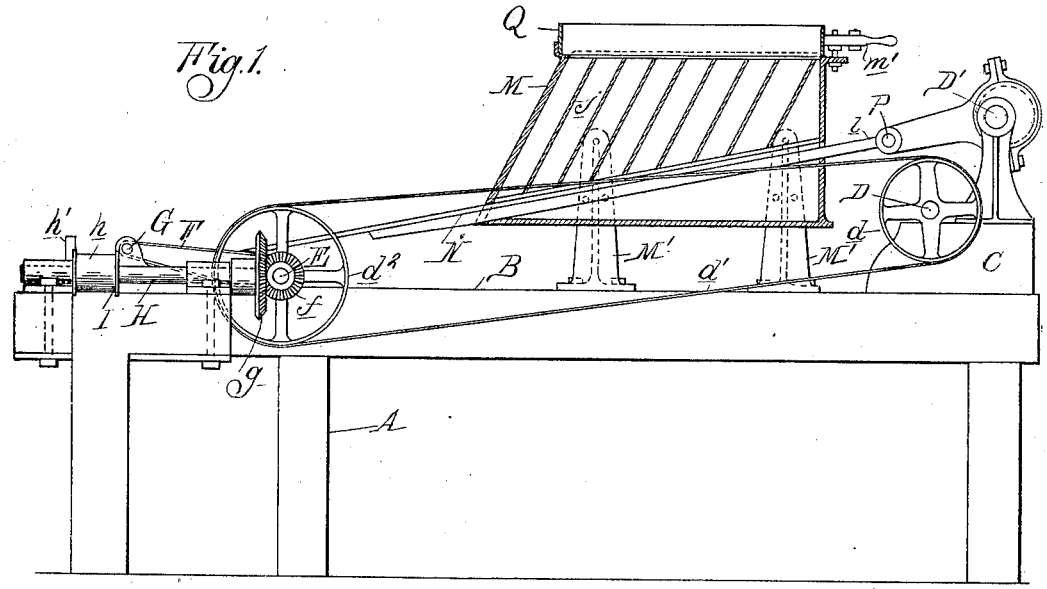
Figure 3:
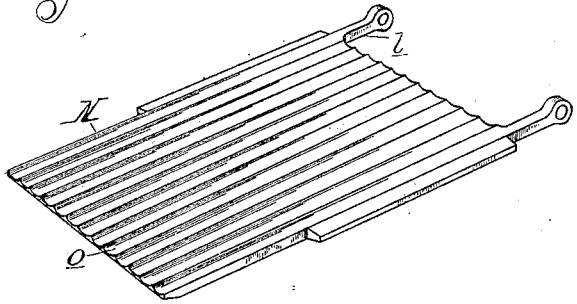

Figure 1 is a side elevation of the machine, showing the hopper in section. Fig. 2 is a plan view thereof, and Fig. 3 is a perspective view showing the construction of the reciprocating hopper-bottom.

A is the frame of the machine, and B is the top, upon which my improved unloading-machine is supported.

C is a bearing-block secured on one end of the top and upon which is mounted in suitable bearings the drive-shaft D, provided on one end with the loose and tight pulleys $a$ $b$ and the gear-wheel $c$, while on the other end is mounted the pulley $d$, carrying a belt $d'$, which transmits motion to the pulley $d^2$, mounted on the end of the transverse shaft E and having a roller $e$ mounted on its middle portion, over which the carrier-belt F passes.

Parallel with the shaft E and mounted in suitable bearings is a shaft G, over which the belt F passes and carries the matches to the transverse belt.

$f$ is a bevel-gear mounted on the end of the shaft E, and $g$ is a bevel-gear meshing therewith mounted on the longitudinal shaft H, secured in bearings on an extension of the top.

I is a pulley mounted on said shaft H, over which the transverse endless carrier-belt $h$ passes, and J is a pulley mounted in adjustable bearings on the opposite side of the top, over which the carrier-belt passes and delivers the matches onto a rotary table K, a suitable metal spout $i$ being pivotally supported on said bearings, so that the matches will be delivered in a continuous row upon the table on which they are packed by the packers seated around the table.

$h'$ is a fence parallel with the edge of the belt $h$ and against which the matches are adapted to strike in being dropped from the belt F.

L is a vertical wall some distance back from the edge of the table, forming a circular pocket in which the boxes to be filled may be placed, so that they will be within reach of the packers, and L' is a stationary rim of said table on which the packers operate. I may accomplish the same purpose by making the carrier-belt $h$ longer and have the packers take the matches directly from the belt $h$.

M is a hopper supported by means of the brackets M'. It is provided with a number of inclined transverse partition-walls $j$, far enough apart to receive a match lengthwise, and $k$ represents a number of intersecting vertical longitudinal partitions.

N is a feed-table which forms a reciprocating bottom for the hopper and slides in inclined guide-bearings formed thereon. It has upon its face a number of longitudinal grooves or corrugations $o$, in which the matches are adapted to travel, said grooves corresponding to the spaces between the vertical partitions $k$. This hopper-bottom N projects forward of the hopper till it comes nearly in contact with the carrier-belt F, upon which it delivers the matches which are sliding down in the grooves of the bottom.

D' is a shaft supported in brackets on the bearing-block C and having a pinion $c'$ at its end meshing with the gear-wheel $c$ on the drive-shaft.

O O are eccentrics mounted on the shaft $D'$ and connecting with the transverse bar P, secured in the ears $l$, formed on the hopper-bottom N, whereby in the operation of the parts a reciprocating motion is imparted to the hopper-bottom, which causes the matches to be fed down the grooves formed in the face of said bottom onto the carrier-belt F. I may and preferably do accomplish this by the use of but one eccentric connected to the middle of the hopper-bottom.

Q represents a dipping-frame placed upon the hopper, and $m$ $m'$ are clamping-fingers mounted upon an extension of the hopper and connected by the link $n$, so that when the frame is placed upon the hopper a slight pressure upon the handle portion of the lever $m'$ will clamp the dipping-frame and enable the operator to remove the pins holding the frame together, so that the matches drop into the compartments of the hopper and by the inclined walls thereof are piled up flat upon the feed-table. The constant reciprocating motion of this table brings them into longitudinal alinement and feeds them by gravity down the inclined grooves in transverse rows to the belt F, which deposits one row after another to the transverse belt $h$, so that they form a continuous string of matches and are thus delivered in perfect alinement onto the rotary table K, which by moving faster or slower may pile them up more or less high as best suited for packing, the packers taking the matches up by the handful and placing them in the boxes.

It will be noticed that the carrier-belt F has a slight upward incline, so as to check the matches as they arrive at the lower end of the hopper-bottom, and thereby bring them into alinement, and having the belt pass over the small shaft G the matches are brought as close to the transverse carrier-belt $h$ as possible, and it being above the transverse belt the acquired momentum of the matches will cause them to strike against the fence and then drop upon the transverse belt in perfect alinement.

I do not limit myself to the use of the carrier-belt $h$, as shown, but include into my invention any endless carrier traveling at substantially right angles to the belt F—as, for example, I may dispense with the use of the transverse carrier-belt $h$ altogether and feed the matches directly from the belt F onto a rotary table of large diameter, as shown in dotted lines in Fig. 2, similar to table K, in which $h'$ is the vertical wall against which the matches are adapted to strike.

I claim—

In a machine for the purpose described, the combination of the stationary feed-hopper, the inclined reciprocating gravity-feed table having longitudinal grooves arranged to receive the matches from said hopper, a carrier-belt traveling in line with said feed-table at a slight upward incline thereto and forming with the same a continuous pathway for the matches, a second carrier-belt traveling at right angles to the first-named carrier-belt and adapted to receive the matches therefrom, the fixed spout $i$ hinged at the end of said last carrier and adapted to receive the matches therefrom, and the revolving ring-table K upon which the free end of the spout is adapted to travel and deliver the matches thereon radially to the ring.

In testimony whereof I affix my signature in presence of two witnesses.

GEORGE EVERSON.

Witnesses:
 OTTO F. BARTHEL,
 V. D. KINNER.